June 6, 1950     C. P. PEPPER     2,510,653
DETACHABLE COUPLING
Filed June 7, 1946
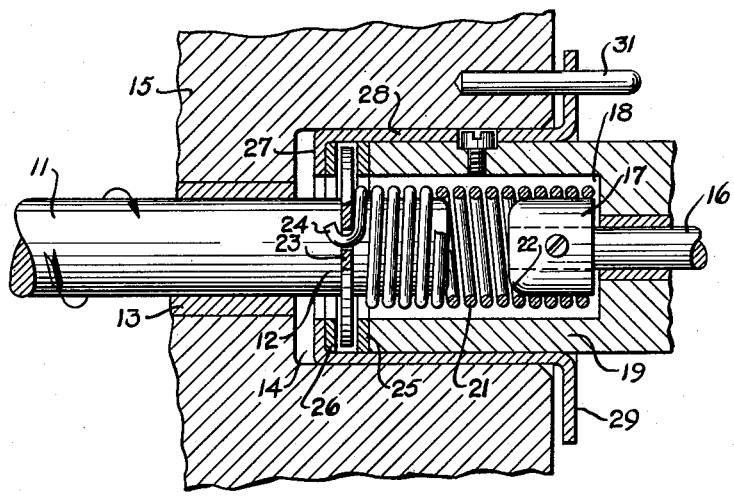
INVENTOR
CARL P. PEPPER.
BY
ATTORNEY Patented June 6, 1950

2,510,653

UNITED STATES PATENT OFFICE 2,510,653

DETACHABLE COUPLING

Carl P. Pepper, Plainfield, Ind., assignor, by mesne assignments, to The Marquette Metal Products Company, Cleveland, Ohio, a corporation of Ohio Application June 7, 1946, Serial No. 675,143

10 Claims. (Cl. 192—47)

This invention relates to couplings for rotating shafts, and particularly to a quick detachable coupling especially adapted for easy attachment to and detachment from a driving shaft for driving relatively light equipment such, for example, as tachometers and other test apparatus.

In many instances it is desirable to momentarily couple such a device to a rotating shaft and then to detach it therefrom without materially lowering the R. P. M. or otherwise affecting the operation of the shaft. Connection of the device to the shaft must also be done with minimum jar or strain in order to protect the parts involved against injury.

An object of this invention is to provide an improved coupling of this type constructed and arranged to permit equipment to be readily and easily connected to and disconnected from a driving shaft during rotation thereof.

A further object is to provide a coupling for driving light test equipment or the like constructed and arranged to permit such equipment to be readily clutched to a rotating shaft and then as readily detached therefrom without having to stop rotation of the shaft.

These and other objects which will be apparent are accomplished by the invention hereinafter described and illustrated in the accompanying drawing, which shows, in section, a coupling constructed in accordance with one embodiment of this invention operatively connecting a driving and a driven shaft together.

The present invention comprises a resilient clutch member having a socket for receiving the projecting drum-forming end of a drive shaft to which the coupling is adapted to be connected. The clutch member is usually directly connected to and made to form a part of the shaft to be driven, such as the operating shaft of a tachometer. The arrangement is such that positioning the clutch socket over the end of the driving shaft automatically causes the shaft to be drivingly engaged by the clutch member. A friction braking mechanism is provided whereby the clutch member is automatically disengaged from the driving shaft upon axial movement of the device relatively to the driving shaft. As a result of this feature, test equipment can be coupled to any suitable driving shaft by moving it into position over the end of said shaft, the axial movement of a part of the equipment causing the declutching mechanism to function to prevent clutching engagement with the driving shaft until the equipment is in operative position. Likewise, movement of the equipment axially of the shaft to remove it therefrom automatically actuates the declutching mechanism to permit ready removal.

The illustrated embodiment of the invention is shown in connection with a driving shaft 11 provided with a projecting end 12 extending through a supporting bearing 13 into a socket 14 formed in the housing 15 on the mechanism, not shown, of which the driving shaft 11 forms a part. The shaft 12 is suitably prevented from moving endwise.

As illustrated, a shaft 16 to be driven, which may, for example, be the operating shaft of a tachometer, or other test equipment, not shown, has a boss or collar 17 secured to the end thereof and located in a pocket 18 formed in the bearing housing 19 of the shaft. A helical clutch spring 21 having a diameter slightly less than the diameter of the boss 17 has one end frictionally engaging a clutch drum surface formed by the outer periphery of the boss 17. The end of the boss has a beveled edge 22 to assist in assembling the parts. A clutch controlling (i. e. spring deenergizing) member in the form of an annular friction disc 23 is connected to the outer free end 24 of the clutch spring 21 in any desired manner, such as that shown in which the end of the spring is hooked through a perforation formed in the friction disc. The friction disc 23 projects radially beyond the circumference of the spring adjacent a friction disc 25 fixedly attached to the inner end of the housing 19 defining the open end of the pocket 18. A second friction disc 26 is located on the opposite side of the friction disc 25, being fixedly mounted on an inwardly extending radial flange 27 on a tubular casing 28 secured to and surrounding the projecting end of the housing 19. As illustrated, the casing has an outwardly projecting radial flange 29 with perforations adapted to receive one or more pins 31 projecting from the fixed driving shaft housing 15 when the coupling is moved into clutching relation therewith. There is enough free play between the driven shaft collar 17 and the bottom of the pocket 18 to enable movement of the housing 19 along the driven shaft a sufficient amount to bring the friction disc 25 into operative engagement with the disc 23 of the clutch spring.

The clutch spring 21 must be selected with regard to the diameter of the terminal drum surface portion of the driving shaft 11 to which it is to be clutched, so that it will frictionally engage the drum surface when positioned thereon. In other words, the inner diameter of the clutch spring is normally slightly less than the outer diameter of the drum surface. The free end of the driving shaft is beveled or rounded to aid the application of the spring thereto. As the housing 19 is being slid into place the friction disc 25 bears against the friction disc 23 of the spring 21 with sufficient force to prevent the coils of the spring from being energized into gripping relation to the drum surface of the rotating driving shaft. That operation requires only a very small restraining force providing it is applied to the free end of the spring as through the hook 24. As soon as the restraining force is relaxed the spring automatically grips the drive shaft with increasing force from coil to coil. As the clutch spring picks up its torque load the flexibility of the free coils of the clutch spring between respective drum portions of the two shafts absorbs the jar of engagement with the rotating shaft and thus protects the driven shaft and the associated mechanism. The coupling can be adapted for use with the shafts of different diameters by selecting a clutch spring of the required diameter for suitable clutching operation. In changing from one size spring to another, it may be necessary to change the spring supporting boss to obtain one having the proper diameter to hold the spring selected, or a spring having ends of different diameters may be employed. Other shapes of springs may also be used as there will usually be no tendency for the turns of the spring to slip off the boss because of the wrapping down action of the spring turns under the progressive coiling or straining forces of clutch engagement once the spring has been released for such action.

Declutching of the spring from the driving shaft is accomplished by movement of the housing 19 and associated friction face 26 axially of the driving shaft, to the right, so as to bring said face 26 into engagement with the clutch controlling friction disc 23 which rotates freely with the clutch spring 21 as long as the latter is clutched to the driving shaft. The frictional resistance to rotation of the disc 23 is transmitted to the deenergizing end 24 of the clutch spring causing the associated clutching portions thereof to be instantly unwrapped sufficiently to release the driving shaft, thus permitting the housing 19 of the associated apparatus to be moved freely endwise clear of the driving shaft. Thus a deenergizing operation on the clutch spring is effected on endwise movement of the housing 19 in opposite directions, so that all of the desired number of coils of the clutch spring (as illustrated) can be applied into full clutching relationship to the driving shaft and removed therefrom during continued rotation of said shaft.

As illustrated, the engagement of the pins 31 with the radial flange 29 of tubular casing 28 prevents any tendency of the housing 19 to rotate with the driving shaft when the mechanisms are clutched together, thus simplifying handling of the device by the operator. When the device is for use in connection with a projecting driving shaft having no surrounding pocket, then the housing 19 must have a different form of support such as an attaching clamp of suitable form for engagement with the housing such as 15.

Although the present invention has been described in connection with a specific embodiment thereof, it will be apparent that it can be variously modified and adapted within the scope of the appended claims.

I claim:

1. A coupling for detachably connecting a driven shaft to a rotating driving shaft, comprising a helical clutch spring mounted on said driven shaft and extending outwardly therefrom to provide an expansible socket for receiving the end of said driving shaft, said spring socket having a diameter when unstrained such that engagement thereof with the surface of said driving shaft causes said spring to wrap down and contract said socket into engagement therewith to clutch said shafts together, a spring controlling mechanism including a member connected to the end of said spring, and means responsive to movement axially of said driving shaft for engaging said member to resist the rotative movement of said member so as to maintain the spring free from clutching engagement with said driving shaft whereby said coupling can be attached to or detached from said driving shaft during rotation thereof.

2. A coupling for detachably connecting a driven shaft to a driving shaft, comprising a helical clutch spring having one end mounted on said driven shaft and the other end projecting outwardly to form a socket adapted to receive the end of said driving shaft and to be positioned in clutching engagement therewith by rotation of said shaft within said socket, and means responsive to movement axially of said driving shaft for declutching said spring therefrom during rotation thereof.

3. A coupling for detachably connecting a driven shaft to a driving shaft, comprising a helical clutch spring having one end mounted on said driven shaft and the other end projecting outwardly to form a socket adapted to receive the end of said driving shaft and to be positioned in clutching engagement therewith, and means responsive to and dependent upon movement axially of said driving shaft for declutching said spring therefrom during rotation thereof, said means being operative only during the period of said axial movement.

4. A coupling for detachably connecting a driven shaft to a rotating driving shaft, comprising an open end helical clutch spring having one end mounted on said driven shaft and the other end projecting outwardly from said shaft to form a socket adapted to be positioned in clutching engagement with the projecting end of said driving shaft, a surrounding socket shaped housing member having friction surfaces thereon, and spring actuating means connected to the open end of said spring in position to engage said friction faces upon movement of said housing member axially of said driven shaft whereby to resist rotative movement of said spring end under impulse of said driving shaft so as to change the diameter of said spring socket to declutch said spring from driving shaft.

5. A coupling for detachably connecting a driven shaft to a rotating driving shaft, comprising an open end helical clutch spring having one end mounted on said driven shaft and the other end projecting outwardly from said shaft to form a socket adapted to be positioned in clutching engagement with the projecting end of said driving shaft, a surrounding socket shaped housing member having friction surfaces thereon, spring actuating means connected to the open end of said spring in position to engage said friction faces upon movement of said housing member axially of said driven shaft whereby to resist rotative movement of said spring end under impulse of said driving shaft so as to change the diameter of said spring socket to declutch said spring from said driving shaft, and means holding said friction faces against rotation.

6. A coupling for detachably connecting a driven shaft to a rotating driving shaft, comprising an open end helical clutch spring having one end mounted on said driven shaft and the other end projecting outwardly from said shaft to form a socket adapted to be positioned in clutching engagement with the projecting end of said driving shaft, a surrounding socket shaped housing member having friction surfaces thereon, a spring actuating disc, a relatively movable friction surface and means for causing said surface to engage said disc, whereby to resist rotative movement of said spring end under impulse of said driving shaft so as to change the diameter of said spring socket to declutch said spring from said driving shaft.

7. A spring clutch unit comprising, a circular driving drum, a coaxial driven member, a clutch spring having one end secured to the driven member and coils normally in gripping relation to the drum, a third member normally rotatable with the spring and having a deenergizing connection with the spring, and a friction brake mechanism arranged to stop rotation of the third member to cause the spring to release the drum so that the drum can overrun the driven member.

8. A clutch comprising, a pair of axially aligned rotary members having circular drum surfaces, a helical clutch spring normally in tight frictional engagement with said drum surfaces, a third member normally rotatable with said drum members and having a normally non-operating deenergizing connection with said spring, and friction braking mechanism operable to arrest rotation of said third member to deenergize the spring in any rotated position thereof.

9. A coupling for detachably connecting two approximately coaxial rotary members during continuous rotation of one of them, said coupling comprising a self-energizing coil spring clutch element drivingly secured to one of the members and having a free end coil portion adapted and arranged to telescope a complementary drum surface of the other and automatically grip the drum surface by progressive coiling action of said coil portion, a spring deenergizing brake element secured to the free end of said coil portion in a manner to enable prevention of such coiling action through restraint of rotation of said brake element, and a cooperating non-rotary brake means movable into and out of frictional engagement with said brake element.

10. The coupling according to claim 9 wherein said brake means comprises spaced friction faces mounted in a common axially shiftable non-rotating housing which, when shifted axially in either direction from a neutral position, moves the brake means into operating engagement with the brake element to maintain the spring ineffective to grip the drum.

CARL P. PEPPER.

REFERENCES CITED

The following references are of record in the file of this patent:

UNITED STATES PATENTS

| Number | Name | Date |
|---|---|---|
| 677,872 | Locke | July 9, 1901 |
| 1,126,780 | Jones | Feb. 2, 1915 |
| 1,718,197 | Starkey | June 18, 1929 |
| 2,024,947 | Racklyeft | Dec. 17, 1935 |
| 2,073,408 | Litchfield | Mar. 9, 1937 |
| 2,130,757 | McCabe | Sept. 20, 1938 |

FOREIGN PATENTS

| Number | Country | Date |
|---|---|---|
| 197,178 | Great Britain | May 10, 1923 |